Patented Dec. 14, 1937

2,102,564

UNITED STATES PATENT OFFICE 2,102,564

INSECTICIDES AND FUNGICIDES

Robert J. Bonstein, Scranton, Pa.

No Drawing. Application November 27, 1933,
Serial No. 700,015

15 Claims. (Cl. 167—33)

This invention relates to insecticides and fungicides, and more particularly to insecticidal and fungicidal compositions comprising the condensation products of inorganic sulfides or selenides with organic halogen compounds.

The principal object of the present invention is to provide an improved insecticidal and fungicidal composition which is highly toxic but which is substantially non-injurious to foliage.

An important object of the invention is to provide an insecticide and fungicide which possesses the desirable properties of lime-sulfur compositions but which surpasses them in toxicity and is substantially neutral in reaction and, therefore, not injurious to foliage.

Another object of the invention is to provide an insecticide and fungicide comprising an organic sulfide or an organic selenide as the active ingredient thereof.

Another object of the invention is to provide an insecticidal and fungicidal composition in which the active ingredient is a condensation product of an organic halogen compound with an inorganic sulfide or selenide.

Other objects and advantages of the invention will become apparent during the course of the following description.

As is well known, the most widely used insecticides and fungicides are the conventional lime-sulfur compositions, of which numerous variations are widely known in the art. While these lime-sulfur compositions are extensively used, because of several advantageous properties thereof, it has been found that in the concentrations normally employed they are not sufficiently toxic to effect the desired "kill" in certain instances, and that if the concentration of active ingredients is increased to increase the toxicity of the compositions, the foliage to which the material is applied is likely to be seriously injured.

As a result of extended research directed to the production of an insecticide and fungicide which will possess the desirable properties of the conventional lime-sulfur compositions but which will avoid the disadvantages attending the use thereof, I have discovered a new type of insecticide and fungicide which fulfills these requirements.

In its broad aspects, my new fungicide and insecticide comprises the condensation product of an inorganic sulfide with an organic halogen compound. More specifically, the new insecticides and fungicides consist of certain sulfur-containing organic compounds prepared by condensing an inorganic sulfide with a carbon compound containing two halogen atoms on adjacent carbon atoms, or a halogen atom and a hydroxyl group on adjacent carbon atoms. In preferred practice, the new compounds are prepared by condensing an alkali-forming metal sulfide, such as calcium or sodium mono- or poly-sulfides, with an organic di-halide, such as ethylene dichloride, an organic hydroxy halide, such as ethylene chlorhydrin, or a halogenated fatty acid such as dibromstearic acid.

While the constitution of these condensation products has not been determined with certainty they appear properly to be regarded as organic sulfides in which the sulfur appears to have replaced the halogen of the original organic halogen compounds. For example, when an organic di-halide, such as ethylene dichloride reacts with a monosulfide, such as sodium monosulfide, the sulfur of the resulting product is very firmly bound and can be split off again only with the greatest difficulty, which indicates that this sulfur is bound to carbon. When a polysulfide is used in place of the monosulfide, the sulfur of the resulting product is, in part, somewhat easy to split off. for example, by warming the substance with an alkaline lead solution. Another part of the sulfur is still very difficult to remove. It appears therefore, that the substance formed from ethylene dichloride and a polysulfide contains some of the sulfur attached to the carbon and the rest of the sulfur attached to the carbon-bound sulfur. The following formulae express what appear to be the reaction between an organic di-halide and a monosulfide and polysulfide:

(1) 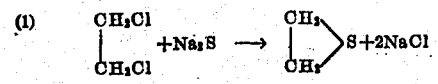

(2) 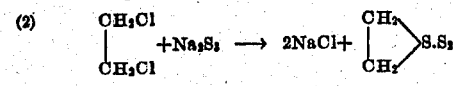

The advantage of these compounds as insecticides and fungicides is that whereas they possess the desirable properties of lime-sulfur and even surpass this in toxicity (being stomach poisons as well as contact poisons), these organic sulfides are neutral in reaction and, therefore, not injurious to foliage. The increased toxicity appears to be due to a slow decomposition into more poisonous products of smaller molecular weight, such as depolymerization products. While all of the condensation products are not identical in insecticidal and fungicidal effect, they are of the same general type and are prepared by a reaction which in principle is the same in all cases.

The inertness of these organic sulfides is an important advantage in that it permits their use in connection with other known insecticides. For example, lead, arsenate, copper and zinc compounds and/or the active principles of pyrethrum, hellbore and the like may be mixed with these organic sulfides without destroying the activity of either.

While I prefer to prepare this new type of insecticide and fungicide with an inorganic sulfide, I have found that the sulfide in the reaction may be replaced in whole or in part by an inorganic selenide. Selenium reacts like sulfur in this reaction, and it is to be understood that one or more equivalents of sulfur may be replaced by selenium in the products described. The insecticidal properties of such selenium-containing compounds are even more marked than those of the substances which contain sulfur alone.

The general method of preparing these condensation products having insecticidal and fungicidal properties consists in bringing together a suitable organic halide and a metallic sulfide or selenide by adding either one in small proportions to an appropriate solution of the other, and heating gently to hasten the reaction. It is generally more convenient to add the organic halide to the sulfide or selenide. As a solvent in which the reaction may take place, either alcohol or water may be used, depending upon the speed of reaction desired. The speed is generally greater when the reaction takes place in alcohol. If desired, the halogen may be diluted with alcohol for convenience in adding it to the sulfide or selenide.

Compounds containing one hydroxyl group and one halogen atom do not add the polysulfide sulfur when used in this reaction. The monosulfide of the organic radical is formed together with free sulfur if a polysulfide has been used. If a monosulfide has been used, a monosulfide of the organic radical and no free sulfur is formed. In this respect the behavior of the hydroxy halogen compounds (such as ethylene chlorhydrin) is different from that of the dihalides (such as ethylene dichloride).

Several specific examples of different condensation products prepared according to the general method described above are set forth below, and all of these are useful as insecticides and fungicides. However, because of their different chemical properties each possesses special advantages for certain cases. For example, the sulfides of ethylene are useful where a water-insoluble insecticide and fungicide is desired, while the sulfides prepared from halogenated fatty acids are soluble in water as soaps, thus combining in one substance the insecticidal principle and the soap which is universally mixed with insecticides before applying them. The sulfide derivative of ethylene chlorhydrin is soluble in water without modification. It will thus be apparent that numerous variations may be produced in the properties of the insecticides prepared according to the present invention, by selecting different organic halides and different metallic sulfides as starting materials.

In some cases as, for example, in the preparation of compounds of sulfur with ethylene, it has been found that polysulfides coalesce readily to form a gummy mass which would be useless as an insecticide, because it could not be applied to the plants. In such cases, it is necessary to modify the reaction so that the sulfide remains in fine suspension after it is formed. This may be done by adding to the reacting mixture a small quantity of a protective colloid. I have found glue to be very suitable for this purpose, but, if desired, other protective colloids such as casein, gum acacia or the like may be employed.

Where the condensation products prepared according to the present invention are not readily soluble or miscible with water, they are preferably mixed with a concentrated solution of ordinary soap to form a jelly which may be converted into an emulsion suitable for application to plants by the addition of water. Of course, this is a conventional method of applying insecticides and fungicides to plant growth and per se forms no part of the present invention.

For the purpose of illustration, there are set forth below several examples of the preparation of different condensation products which have been found to be suitable as insecticides and fungicides. However, it is to be understood that these illustrative examples merely indicate the general type of products suitable for use in accordance with the present invention and that the invention is not limited to the specific compositions described. Moreover, while the several examples are specifically directed to the preparation of organic sulfides, since these are the preferred compounds for use in the practice of the present invention, it is to be understood that the sulfur may be replaced in whole or in part by selenium. For example, in place of a polysulfide of sodium or calcium, there could be used without material modification in the process of preparation of the condensation products, inorganic selenides such as calcium di-selenide ($CaSe_2$), calcium sulfo-selenide ($Ca.S.Se$) or the like.

Example 1

According to this example, an organic di-halide is condensed with an alkali-forming metal monosulfide to prepare an organic sulfide. Ethylene dichloride may be advantageously used as the organic di-halide and sodium monosulfide may be employed as the alkali-forming metal monosulfide. When these materials are used, one-tenth mol. of sodium monosulfide is dissolved in 100 cc. of water, preferably but not necessarily containing 1 to 2 per cent. by weight of glue or other protective colloid such as casein, gum acacia or the like. The mixture is stirred under a reflux condenser and 8.8 cc. (0.11 mol.) of ethylene dichloride are added slowly, so that at no time is there a large excess of the ethylene dichloride in the presence of the sodium sulfide. The temperature of the reacting mixture is kept near the boiling point of ethylene dichloride, either by heating or cooling, whichever may be necessary. The addition of the ethylene dichloride requires about an hour, and the heating and stirring are continued for about thirty minutes longer. Obviously, this time will vary considerably with the efficiency of the agitation. As the reaction progresses, a white, finely divided precipitate forms. When a drop of the reacting liquid no longer gives a strong sulfide test when added to an alkaline lead solution in the cold the reaction may, for practical purposes, be considered as completed.

In order to prepare the condensation product for use as an insecticide and fungicide, the precipitate is washed until as free from salts as desired, and the moist resulting product is then mixed with a warm concentrated water solution of soap of the type ordinarily used in insecticidal sprays. The amount of soap in the final mixture may vary widely, but when the amount is so gauged that it constitutes between 5 and 10 per cent by weight of the final product, the material soon sets to a firm white jelly which is very suitable for use as a concentrated insecticidal and fungicidal composition. This jelly forms an emulsion when mixed with water, and may then be used in an ordinary spraying apparatus. If desired, a wetting agent, such as skim milk, casein preparations or the like may be used together with or as a substitute for the soap. The sulfur compounds are chemically inert toward such wetting agent either when used alone or in admixture with soap.

*Example 2*

According to this example, an organic di-halide, such as ethylene dichloride, is condensed with an alkali-forming metal polysulfide, such as sodium or calcium polysulfide, or the halide may, if desired, be condensed with a selenide, such as calcium diselenide or calcium sulfoselenide. Assuming ethylene dichloride and an alkali-forming metal polysulfide to be the starting materials employed, these are condensed in the same manner as described in Example 1, except that the addition of a protective colloid must not be omitted. The end of the reaction is best recognized by a litmus test, the reaction being complete when the reacting mixture is neutral to litmus. The subsequent washing and suspension in a soap solution may be carried out as described in Example 1.

*Example 3*

The starting materials employed in this example may be the same as those employed in Example 1 but the reaction is carried out in the presence of alcohol as a solvent. For example, one-tenth mol. of sodium monosulfide is dissolved in as little alcohol as possible. Since sodium monosulfide is ordinarily employed as a highly concentrated solution, the alcoholic solution will contain some water, and a solution containing 80 or 85 per cent. alcohol by volume may be used. The alcohol solution is kept warm in order to hold as much of the sulfide in solution as possible. To this solution one-tenth mol. of ethylene dichloride is added slowly and with stirring, the temperature being held near the boiling point of the alcohol. The reaction is completed in about twenty minutes, as indicated by the practical disappearance of ionizable sulfide in the reacting mixture. The alcohol is then distilled off for use in another run, being replaced by added water. The white condensation product is washed and suspended in a soap solution as described in the preceding examples.

*Example 4*

According to this example, a halogenated fatty acid is condensed with a metallic sulfide. The starting materials may advantageously be dibromstearic acid and sodium monosulfide. When these materials are employed, one-tenth mol. of the sodium soap of the dibromstearic acid made by the known methods of brominating oleic acid or eleadic acid, is dissolved in 50 cc. of warm alcohol, and added to the equivalent amount of an alkali-forming metal mono- or poly-sulfide, preferably sodium monosulfide, also dissolved in warm alcohol, the solution not containing in excess of 25 per cent. water. The mixture is stirred and heated to the boiling point under a reflux condenser until the condensation is complete, which takes about three hours. On cooling, sodium bromide separates out, and the alcoholic solution is then separated from the salt. The alcohol is then recovered from the mass by distillation. The resulting sulfide soap is soluble in water and may be dissolved in a convenient amount of water for use as an insecticide and fungicide.

*Example 5*

In this example, an organic hydroxy halide, such as ethylene chlorhydrin, is condensed with a sulfide, such as sodium monosulfide. These materials are condensed in the manner described in the preceding examples, the ethylene chlorhydrin preferably being added gradually to an alcoholic or aqueous solution of the sulfide. An alcoholic solvent is preferred since in alcohol the reaction is practically instantaneous and requires little or no heating. Sodium chloride separates out of the alcoholic solution upon the cooling of the latter. The salt is removed and the alcohol is recovered from the resulting mass as described in the preceding examples. The resulting condensation product is soluble in water and in alcohol in all proportions, and may be used directly as an insecticidal and fungicidal spray when dissolved in a convenient amount of water. If desired, soap may be mixed with the spray but this has not been found to be necessary.

The term "organic halogen compounds" as used herein is intended to include carbon compounds containing one or more halogen atoms, such as organic halides, of which ethylene dichloride is an example, organic hydroxy halides, of which ethylene chlorhydrin is an example, and halogenated fatty acids, of which dibromstearic acid is an example.

The term "sulfides" as used herein is intended to include both mono- and poly-sulfides.

While I have described in detail several preferred embodiments of my invention it is to be understood that the details of procedure may be variously modified without departing from the spirit of the invention or the scope of the subjoined claims.

I claim:

1. An insecticide and fungicide comprising a water dispersible condensation product of an inorganic salt, selected from the group consisting of inorganic sulfides and inorganic selenides, with an olefin di-halide.

2. An insecticide and fungicide comprising a water dispersible condensation product of an inorganic salt, selected from the group consisting of inorganic sulfides and inorganic selenides, with ethylene dichloride.

3. An insecticide and fungicide comprising the condensation product of an inorganic salt, selected from the group consisting of inorganic sulfides and inorganic selenides, with a hydroxy halide of an aliphatic carbon compound.

4. An insecticide and fungicide comprising a water-dispersible condensation product of an inorganic salt, selected from the group consisting of inorganic sulfides and inorganic selenides, with ethylene chlorhydrin.

5. An insecticide and fungicide comprising a water-dispersible condensation product of an inorganic salt, selected from the group consisting of inorganic sulfides and inorganic selenides, with a di-halogenated fatty acid.

6. An insecticide and fungicide comprising a water-dispersible condensation product of an inorganic salt, selected from the group consisting of inorganic sulfides and inorganic selenides, with dibromstearic acid.

7. An insecticide and fungicide comprising a water-dispersible condensation product of an inorganic sulfide with an olefin di-halide.

8. An insecticide and fungicide comprising a water-dispersible condensation product of an inorganic sulfide with ethylene dichloride.

9. An insecticide and fungicide comprising a water-dispersible condensation product of an inorganic sulfide with a hydroxy halide of an aliphatic carbon compound.

10. An insecticide and fungicide comprising a water-dispersible condensation product of an inorganic sulfide with ethylene chlorhydrin.

11. An insecticide and fungicide comprising a water-dispersible condensation product of an inorganic sulfide with a di-halogenated fatty acid.

12. An insecticide and fungicide comprising a water-dispersible condensation product of an inorganic sulfide with dibromstearic acid.

13. An insecticide and fungicide comprising a water-dispersible condensation product of an inorganic salt, selected from the group consisting of inorganic sulfides and inorganic selenides, with an organic halogen compound selected from the group consisting of aliphatic carbon compounds containing two halogen atoms on adjacent carbon atoms, and aliphatic carbon compounds containing a halogen atom and a hydroxyl group on adjacent carbon atoms.

14. An insecticide and fungicide comprising a water-dispersible condensation product of an inorganic sulfide with an aliphatic carbon compound containing two halogen atoms on adjacent carbon atoms.

15. An insecticide and fungicide comprising a water-dispersible condensation product of an inorganic sulfide with an aliphatic carbon compound containing a halogen atom and a hydroxyl group on adjacent carbon atoms.

ROBERT J. BONSTEIN.